United States Patent
Rühl et al.

(10) Patent No.: US 6,622,551 B2
(45) Date of Patent: Sep. 23, 2003

(54) APPARATUS FOR BALANCING VEHICLE WHEELS

(75) Inventors: Klaus Rühl, Wenigumstadt (DE); Andreas Ries, Darmstadt (DE); Eberhard Klett, Darmstadt (DE); Dieter Fornoff, Darmstadt (DE)

(73) Assignee: Snap-on Equipment GmbH, Pfungstadt (DE)

( * ) Notice: Subject to any disclaimer, the term of this patent is extended or adjusted under 35 U.S.C. 154(b) by 0 days.

(21) Appl. No.: 09/784,324

(22) Filed: Feb. 16, 2001

(65) Prior Publication Data

US 2002/0026823 A1 Mar. 7, 2002

(30) Foreign Application Priority Data

Mar. 14, 2000 (DE) .......................... 100 12 356
Feb. 16, 2000 (DE) .......................... 100 06 991

(51) Int. Cl.[7] .............................................. G01M 1/02
(52) U.S. Cl. .............................. 73/146; 73/66; 73/487
(58) Field of Search ........................ 73/146, 66, 460, 73/487

(56) References Cited

U.S. PATENT DOCUMENTS

| | | | |
|---|---|---|---|
| 3,521,495 A | * | 7/1970 | Schildmeier |
| 3,911,751 A | * | 10/1975 | Shooter et al. ................ 451/1 |
| 4,336,715 A | * | 6/1982 | Arnold et al. ............... 73/462 |
| 4,491,013 A | * | 1/1985 | Bubik ......................... 73/146 |
| 4,936,138 A | * | 6/1990 | Cushman et al. ............. 73/146 |
| 5,189,912 A | * | 3/1993 | Quinlan et al. ............... 73/462 |
| 5,311,777 A | | 5/1994 | Cunningham et al. |
| 5,509,307 A | * | 4/1996 | Humber et al. ............... 73/462 |
| 5,804,723 A | * | 9/1998 | Coetsier et al. .............. 73/475 |
| 2002/0000121 A1 | * | 1/2002 | Carter et al. ................ 73/459 |

FOREIGN PATENT DOCUMENTS

| EP | 0 557 240 A | 8/1993 |
|---|---|---|
| EP | 0 767 364 A | 4/1997 |

OTHER PUBLICATIONS

International Search Report dated Aug. 12, 2002 issued in corresponding European Application No. 01100665.7–1236.

* cited by examiner

Primary Examiner—Eric S. McCall
(74) Attorney, Agent, or Firm—Shook, Hardy & Bacon LLP

(57) ABSTRACT

An apparatus for balancing vehicle wheels, comprising a machine frame 10, a main shaft 12 which is mounted rotatably in the machine frame 10 and on which a vehicle wheel to be balanced can be clamped, and a guard hood 20 which at least partially engages over the vehicle wheel to be balanced and which has a stationary guard hood element 22 and a movable guard hood element 24 which is movable reversibly from an operative position into an inoperative position, wherein an operating and display unit 40 is arranged in the region of the end 22a of the stationary guard hood element 22, which faces into the operative position of the movable guard hood element 24.

20 Claims, 6 Drawing Sheets

APPARATUS FOR BALANCING VEHICLE WHEELS

The present invention concerns an apparatus for balancing vehicle wheels in accordance with the classifying portion of claim 1.

BACKGROUND OF THE INVENTION

An apparatus of that kind, which is known from German utility model No 16 96 373, serves for compensating for unbalance of vehicle wheels by fitting balancing weights. That can involve for example wheels of motorcycles, automobiles, trucks etc. In order to be able to implement the wheel-balancing operation the vehicle wheel to be balanced is clamped on the main shaft of the apparatus. The wheel is then set in rotation and at least one location for fitting a balancing weight to the wheel is ascertained. After the weight has been fitted the freshly balanced wheel is removed from the apparatus. Such apparatuses have a guard hood to prevent fouling of the workshop and injury to the operator while the main shaft and the wheel clamped thereon are rotating. In the known apparatus the guard hood comprises a guard hood element which is stationary, being fixedly connected to the foundation structure of the machine, and a movable guard hood element which is reversibly movable between an operative position and an inoperative position along an arcuate guide afforded by the stationary guard hood element. The arcuate guide is formed by grooves along which the movable guard hood element is slidably guided.

In an apparatus which is known from EP 0 767 364 A1, the guard hood comprises a stationary guard hood element rigidly mounted to the machine frame structure and a movable guard hood element reversibly movable from an inoperative position in which the wheel can be fitted on the main shaft and removed therefrom, into the operative position. In the operative position, the movable guard hood element in conjunction with the stationary guard hood element extends around the vehicle wheel along the tread surface thereof, through more than 180° C. The movable guard hood element is arranged in relation to the stationary element, on the side thereof which faces away from the main shaft, and it can be pivoted into its two positions by means of a pivot lever which extends substantially parallel to the main shaft and which is mounted to the machine frame structure. The presence of the additional pivot lever means that this arrangement is comparatively complicated and expensive, both in terms of the material used and also in terms of manufacturing and assembly costs.

A further problem in connection with apparatuses of the above-indicated kind is that, when the operator is rotating the wheel to be balanced into the respective position for balancing thereof, the operator must continuously observe an operating and display unit which inter alia shows the direction of rotation of the wheel to move it into the balancing position. In the case of the previously known apparatuses for example EP 767 364 A1, EP 557 240 B1 or DE 85 17 924 U1, that operating and display unit is arranged on the machine frame structure in such a way that an operator is required to turn his head when working on the wheel. That is unsatisfactory from ergonomic points of view and can also result in defective operation of the apparatus.

SUMMARY OF THE INVENTION

The object of the present invention is to provide an apparatus of the above kind, which ensures ergonomically appropriate operation thereof.

That object is attained by the features of claim 1. Advantageous configurations are set forth in the following claims.

For that purpose the operating and display unit is disposed at the end of the stationary guard hood element, which faces to the operative position of the movable guard hood element. The operating and display unit may include at least a monitor and at least one or more operating elements.

Advantageously the operating and display unit is arranged in the direction of view of the operator, that is to say radially relative to the main shaft, directly on the guard hood. The operating and display unit is arranged on the stationary guard hood element in such a way that the movement of the movable guard hood element is not impaired thereby. That can therefore provide an ergonomically appropriate structure for the location of installation of the operating and display unit, which was not possible in the use of the previously known apparatuses.

It is advantageous if the movable guard hood element is mounted movably to the stationary guard hood element by way of a guide means, in order thereby to ensure reliable and safe movement of the movable guard hood element while also ensuring that the apparatus overall is of a compact structure.

The guide means can be of any design configuration and adapted to the specific needs involved. A particularly advantageous structure provides that the guide means is formed by at least one guide rail mounted to the movable guard hood element and at least one guide roller mounted to the stationary guide hood element and in contact or engagement with the guide rail. In that case for example the guide rail can be disposed approximately in the middle of the movable guide hood element and the guide roller can also be disposed in the middle of the stationary guide hood element. The guide rail can then be of an L-shaped cross-section, in which case the at least one guide roller and more particularly two guide rollers roll on the substantially horizontally extending limb of the L-shape of the guide rail.

In principle the guide roller can be arranged at any suitable location on the stationary guard hood element. A particularly compact and easily maintainable structure for the guide hood can be achieved if the guide roller is arranged at the end of the stationary guard hood element, which faces to the operative position of the movable guard hood element.

As has already been noted above, the guide means can be formed from at least one guide rail and at least one guide roller. To ensure a secure guidance effect and thus good operability, it is advantageous for the guide means to comprise two guide rails which are respectively mounted to edges of the movable guide hood element, which edges extend in the direction of movement of the movable guard hood element, and includes eight guide rollers of which four are respectively arranged in pairs on each of the two edges of the stationary guard hood element, those edges extending in the direction of movement of the movable guard hood element. To reduce the risk of injury to the operator, it is possible to provide in the region of the guide roller or rollers a cover means, for example in the form of a rail which extends perpendicularly to the guard hood element, or a like portion of sheet metal.

The guide means and more particularly the guide rollers of the guide means can be provided at the inwardly facing side of at least one guard sheet metal strip at the upper end of the stationary guard hood element. The guard strip can extend around the path of movement of the movable guard hood element. Preferably, guard strips bearing the guide rollers provided at the inward sides are arranged at both sides of the upper end regions of the stationary guard hood element.

It can further be provided that the movement of the movable guard hood element from the inoperative position into the operative position and vice-versa is limited by abutments in order to be able securely to define the limit positions of the movement of the movable guard hood element, that is to say the inoperative position and the operative position respectively thereof.

To facilitate handling of the apparatus on the part of the operator, the apparatus in accordance with the invention is provided with at least one weight-compensating device for the movable guard hood element.

In order to ensure reliable guidance for the guide roller on the guide rail, the guide roller may be provided with a guide profile, more particularly a guide groove by means of which it is in with the guide rail. If the guide means includes a plurality of guide rollers, preferably all guide rollers at an edge of the stationary guard hood element also provided with guide grooves.

The shape of the two guard hood elements can be adapted to the respective circumstances. A particularly appropriate and compact shape is achieved if the two guard hood elements are each in the form of a segment of a circle or an arc with at least approximately equal radii of curvature.

As in particular the operator is intended to be protected by the guard hood and as moreover the movable guard hood element faces towards the operator in operation of the apparatus, it is further advantageous, to ensure that the operator is safely protected, if the movable guard hood element is of a greater width as measured approximately transversely with respect to its direction of movement, than the stationary guard hood element.

In order that the movable guard hood element can be moved from the inoperative position to the operative position and vice-versa by the operator, it is further advantageous if a gripping bar is mounted to the end of the movable guard hood element, which end faces towards the operative position thereof. The gripping bar preferably extends transversely with respect to the direction of movement.

In addition a telescopic bar may be pivotably mounted to the end of the movable guard hood element, which faces towards the operative position, while the second end of the telescopic bar is pivotably mounted to the stationary guard hood element. In that arrangement, the pivotable mountings may be such that the telescopic bar is mounted to the stationary guard hood element such that it extends substantially horizontally when the movable guard hood element is in the operative position.

The telescopic parts of the telescopic bar, which are in telescoping relationship with each other, can be subjected to the force of a spring member and the action of a damping member. That can provide a weight-compensating effect for the movable guard hood element. That also provides for absorbing shock loadings or impacts in the movement, more particularly in the respective end positions of the guard hood element.

The telescopic bar however may also be a carrier for devices for measuring distance and diameter, in the form of sensing levers or sensors which measure in a contact-less mode. That makes it possible to easily determine the respective type of wheel or wheel rim involved, and to implement subsequent setting of the measurement and evaluation unit of the balancing machine.

In addition, when the guard hood is closed, the telescopic bar can afford protection to prevent a person from reaching into the wheel which rotates in the measuring operation. It is also possible for that purpose to provide a cover in the region of the clamping device with which the wheel to be balanced is clamped on the main shaft.

In order to make it easier for the wheel which is to be balanced to be mounted on and removed from the main shaft, the apparatus may further include a ramp at the bottom of the machine support structure, so that a vehicle wheel can be rolled up and down the ramp.

Further advantageous configurations and an embodiment by way of example are described hereinafter with reference to the accompanying drawings. In this connection it is to be noted that the terms used in the description hereinafter 'down', 'up', 'left' and 'right' relate to the drawings with the legends legible in the normal fashion.

DETAILED DESCRIPTION OF THE PREFERRED

Figure 1:
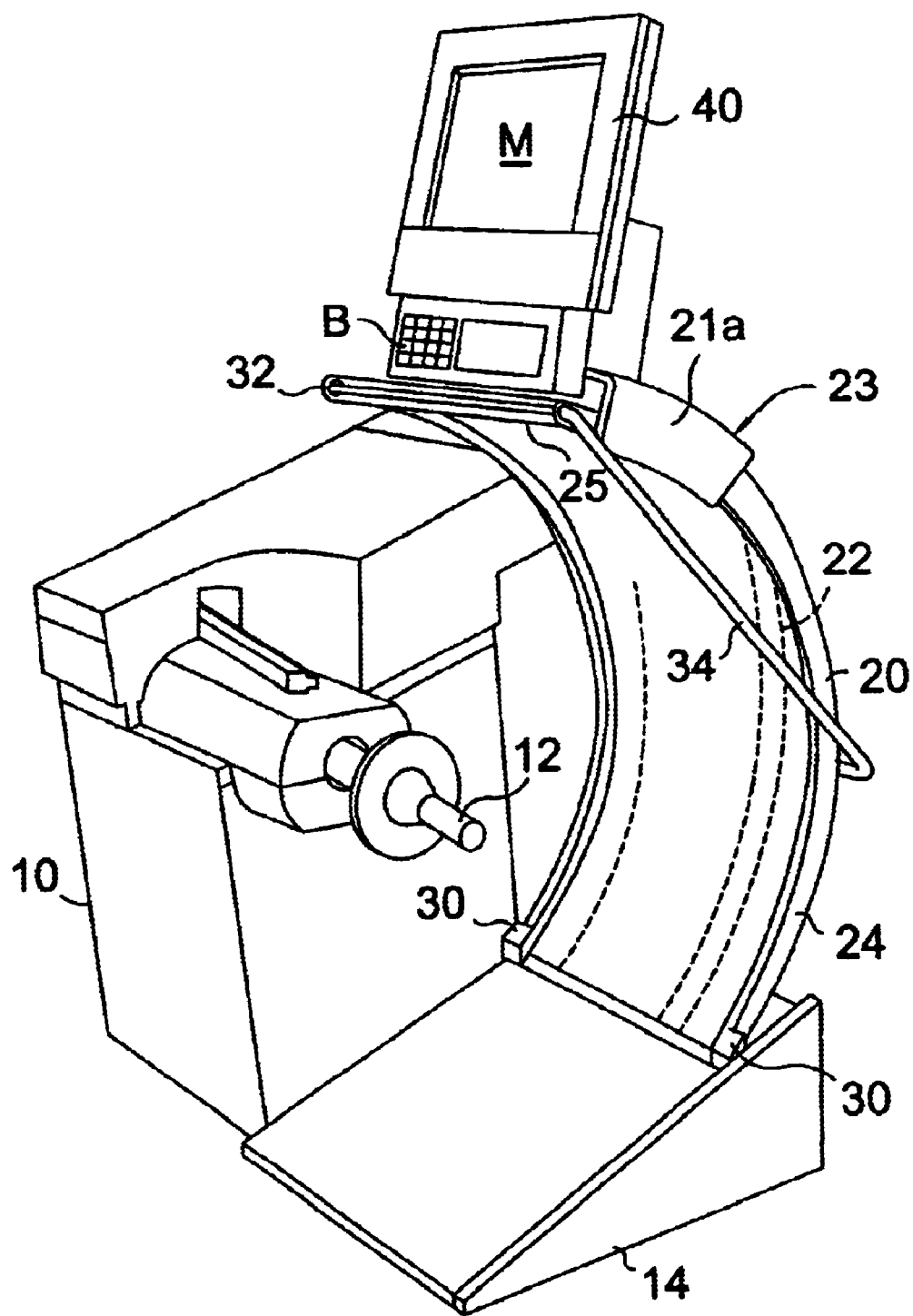
FIG. 1 is a diagrammatic perspective view of an apparatus according to the invention showing a movable guard hood element in an inoperative position.

The apparatus according to the invention shown in FIG. 1 for balancing vehicle wheels includes as its main structural units a machine frame or support structure 10, a substantially horizontally extending main shaft 12 for mounting thereon a vehicle wheel (not shown) to be balanced, a ramp 14 arranged at the bottom of the machine support structure 10, a guard hood 20 mounted to the machine support structure 10 and/or to the ramp 14, and an operating and display unit 40.

The machine frame structure 10 accommodates inter alia the drive for the main shaft 12, the power supply unit for the drive, a measuring device for wheel unbalance measurement and a control assembly. Those components are disposed in the interior of the cuboidal machine support structure 10 and are suitably enclosed by casing plates (not shown).

The main shaft 12 extends substantially horizontally from the machine support structure 10 towards the right. It includes a clamping arrangement (not shown) for clamping a vehicle wheel to be balanced, on the main shaft 12. In addition, the main shaft 12 is provided with measurement pick-ups for detecting wheel unbalance and for determining the balancing positions. Also provided at the right-hand side of the machine support structure 10 beneath the main shaft 12 is the ramp 14 by means of which a vehicle wheel to be balanced can be rolled upwardly thereon so that it then only has to be lifted by a short distance to the main shaft 12 or lowered therefrom. The ramp 14 is mounted to the machine support structure 10 at the bottom thereof, that is to say at floor level.

The guard hood 20 comprises a stationary guard hood element 22 with an upper end 23 and a movable guard hood element 24. Both the stationary guard hood element 22 and also the movable guard hood element 24 are formed by a sheet metal portion which is of a generally arcuate configuration or in the general shape of a segment of a circle, with both elements 22, 24 being of approximately the same radius of curvature. The two guard hood elements 22, 24 extend over an angular range of between greater than 90° and less than 180°, although it will be appreciated that it is also possible to use any other angular range. The two guard hood elements 22, 24 each extend along the tread surface of a vehicle wheel to be balanced.

Figure 2:
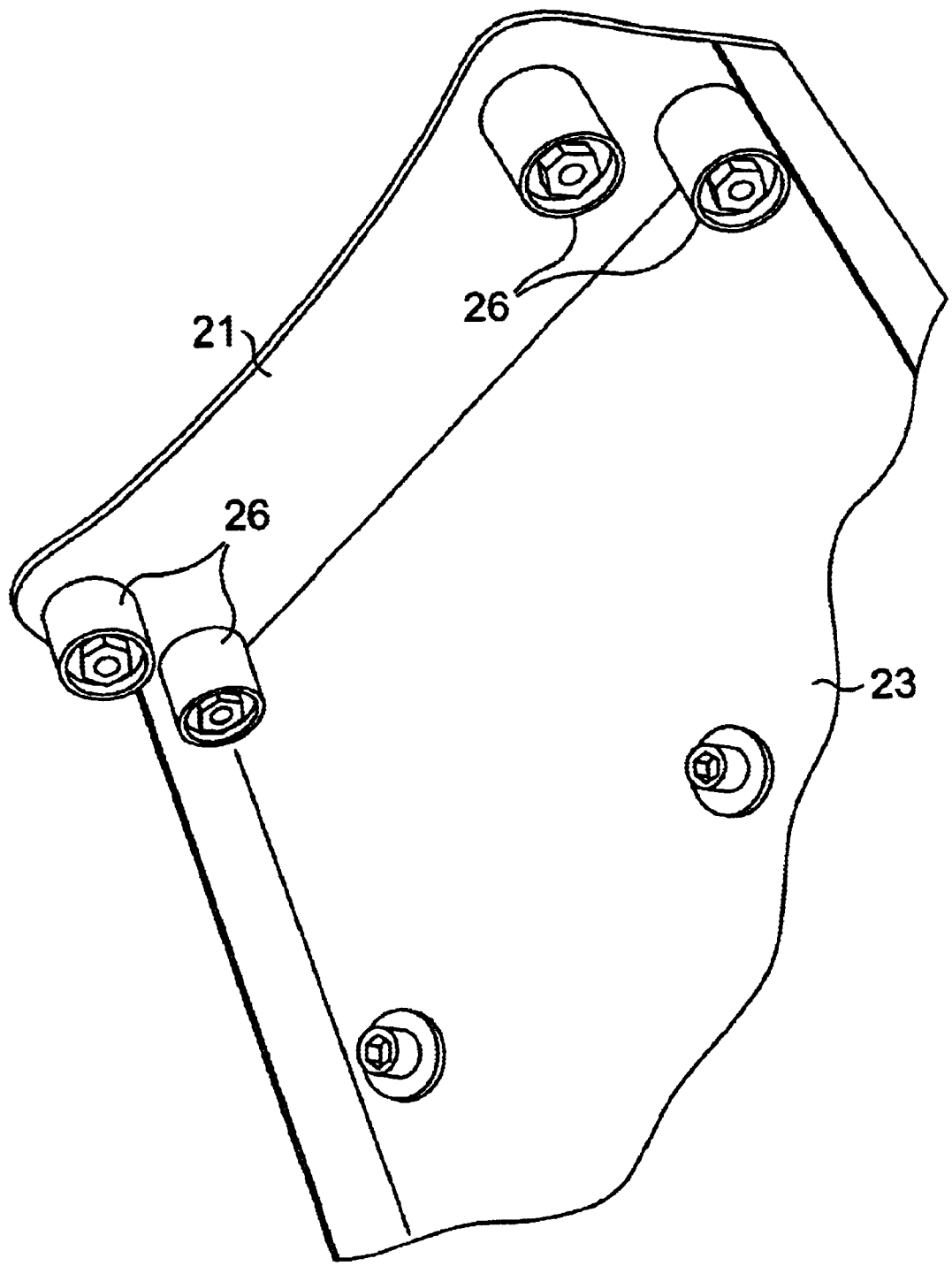
FIG. 2 shows a diagrammatic perspective view from below of a stationary guard hood element of the apparatus shown in FIG. 1, with guide rollers mounted thereto.
Figure 4:
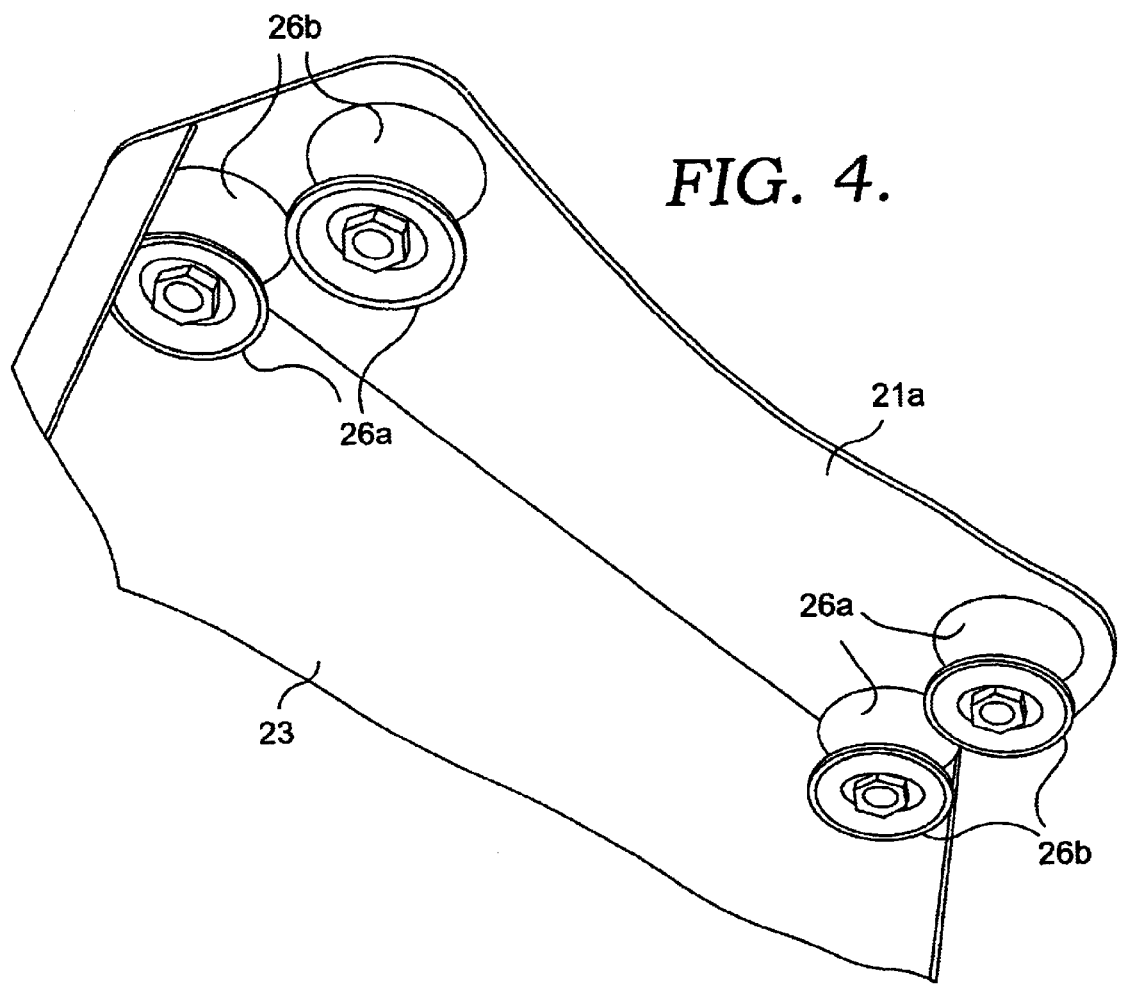
FIG. 4 shows a diagrammatic perspective view from below of the stationary guard hood element with further guide rollers arranged on the side of the stationary guard hood element, which is opposite to the side shown in FIGS. 3 and 4.
Figure 6:
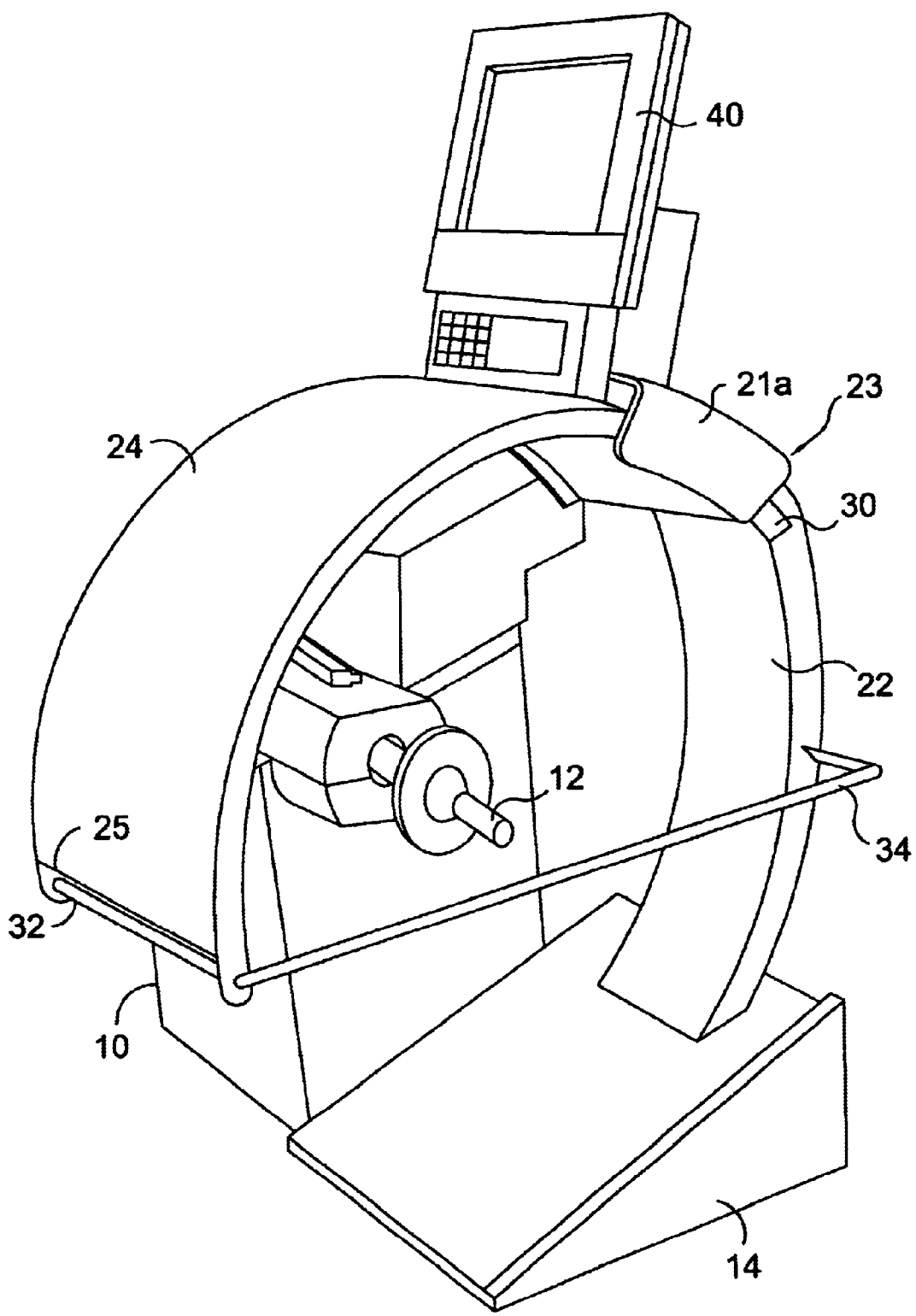
FIG. 6 shows the apparatus of FIG. 1, with the movable guard hood element in the operative position.

The movable guard hood element 24 is movable reversibly from an inoperative position, as shown in FIG. 1, into an operative position as shown in FIG. 6. Movement of the movable guard hood element 24 occurs within an upper end 23 of the stationary guard 22, and the movable guard hood element 24 is supported by sets of rollers mounted on opposing sides of the upper end 23. This permits the movable guard hood element 24 to slide along such rollers and beneath a display unit 40 mounted on the upper end 23. For that purpose, the apparatus includes within the upper end 23 a guard assembly 26, 28 comprising guide rollers 26, 26a mounted within the upper end 23 of the stationary guard hood element 22 and guide rails 28 and 28a that are on opposite sides of the movable guard hood element 24. As can be seen from FIGS. 2 and 4, four guide rollers 26 and 26a are arranged in respective pairs on the upper end 23 of the stationary guard hood element 22, specifically at each of the two edges or sides, 21 and 21a, which extend parallel to the direction of movement of the movable guard hood element 24. FIG. 2 is a view from below showing the four guide rollers 26 arranged in pairs on the left-hand side 21 of the upper end 23 of the stationary guard hood element 22, whereas FIG. 4 shows the four guide rollers 26a arranged in pairs on the right-hand side 21a of the upper end 23 of the stationary guard hood element 22. The axes of the guide rollers 26 extend substantially horizontally and are mounted to the inward side of a sheet metal side 21 which extends substantially perpendicularly to the arcuate upper end 23 of the guard hood element 22 and can be formed on the guard hood element 22 by bending over the sides. With that configuration, the sides 21 and 21a encloses the upper end 23 of the stationary guard hood element 22. The sides 21 and 21a can be formed on the upper end 23 of the stationary guard hood element 22 at both sides thereof and thus serve as mounting locations for the guide arrangement.

Figure 7:
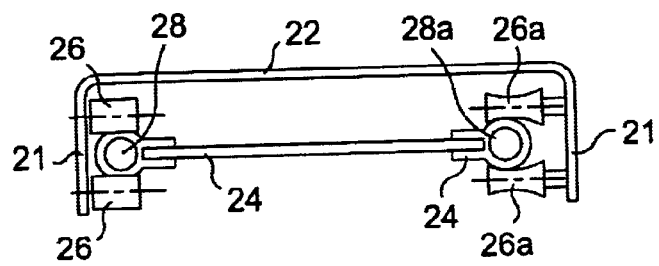
FIG. 7 shows a view from the front of an embodiment using the guide rollers shown in FIGS. 2 and 4.

As can further be seen from FIGS. 2 and 4, the two sets of four guide rollers 26 and 26a are arranged in pairs on each bent-over guard strip or side 21 and 21a, respectively, in such a way that a respective guide rail 28 and 28a, which will be described in greater detail hereinafter, can be accommodated there between. As FIGS. 2 and 4 show, the guide rollers 26a which are provided on the right-hand side 21a of the upper end 23 of the stationary guard hood element 22 each involve a guide profile, formed more particularly by a guide groove 26b whereas the guide rollers 26 on the left-hand side 21 can have a smooth cylindrical outside periphery. FIG. 7 shows the way in which guide rails 28 and 28a secured to the two edges of the movable guard hood element 24 are guided between the respective pairs of rollers 26 and 26a.

Figure 3:
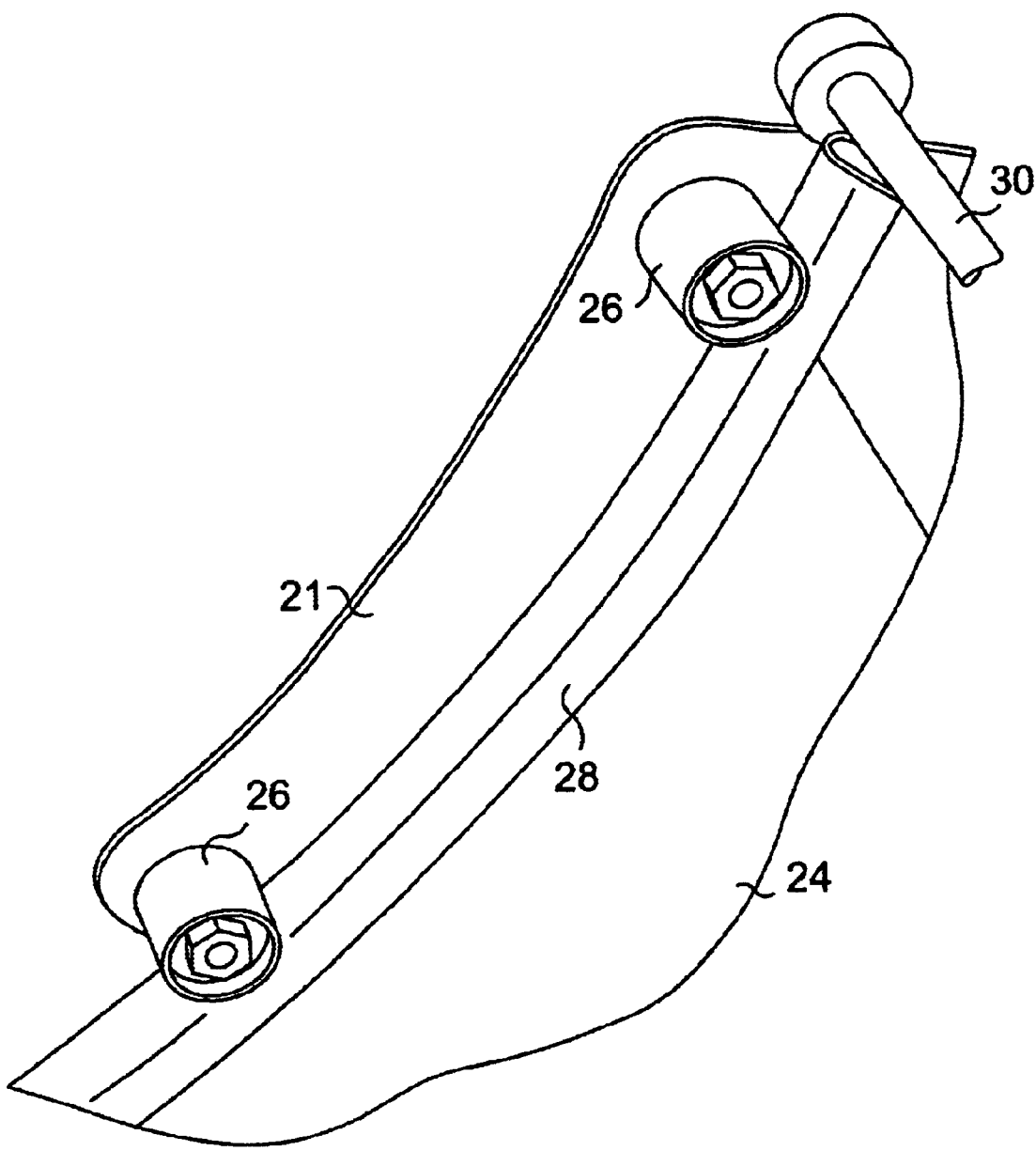
FIG. 3 shows the guide rollers of FIG. 2 in the condition of engagement with a guide rail mounted to the movable guard hood element of the apparatus of FIG. 1.
Figure 5:
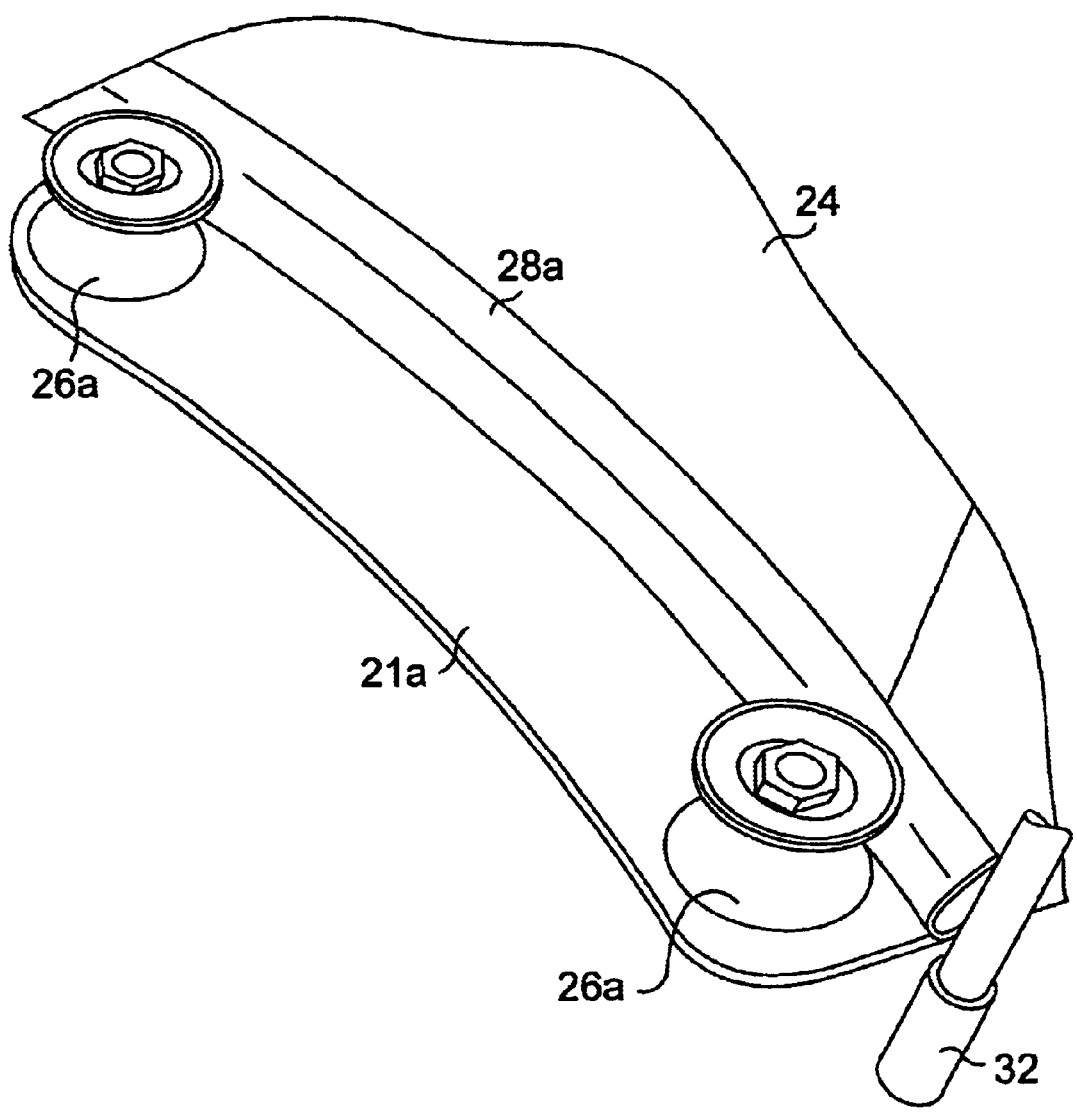
FIG. 5 shows a diagrammatic perspective view of the guide rollers illustrated in FIG. 4 in the condition of engagement with a guide rail mounted to the movable guard hood element.

In the case of the structure shown in FIGS. 3 and 5, the movable guard hood element 24 is provided at its underside at the edges with guide rails indicated at 28 and 28a. The guide rails are received between the guide rollers 26 and 26a, which are arranged in pairs, on the sides 21 and 21a, of the upper end 23 of the stationary guard hood element 22. The guide rollers 26 and 26a are also mounted rotatably on the bent over guard sides 21 and 21a.

Abutments 30 are provided at the respective limit points to limit the movement of the movable guard hood element 24 into the operative position and the inoperative position respectively. The abutments 30 are arranged at both ends of the movable guard hood element 24. In the limit position when the guard hood is closed, (FIG. 6) the abutments 30 bear against the stationary guard hood element 22. In principle however the abutments 30 may be arranged at other structural units or structural elements of the apparatus according to the invention. The abutment for defining the inoperative position can also be formed by the ramp 14.

So that the operator can easily handle the movable guard hood element 24, the end 25 of the movable guard hood element 24, which faces towards the operative position, has a gripping bar 32 which extends substantially over the entire width of the movable guard hood element 24.

The apparatus further includes a telescopic bar 34 which is pivotably connected by one end thereof to the movable guard hood element 24 and by the other end thereof to the stationary guard hood element 22.

As can be seen in particular from FIG. 6, one end of the telescopic bar 34 can be pivotably connected to the gripping bar 32 of the movable guard hood element 24 and the other end of the telescopic bar 34 connected to the stationary guard hood element 22 in such a way that, when the movable guard hood element 24 is in the operative position, the telescopic bar 34 extends substantially horizontally.

To provide a weight-compensating effect the interengaged telescoping parts of the telescopic bar 34 can be subjected to the force of a spring and/or can be acted upon by a damping member. This not only makes operation easier, but it also absorbs shocks and impacts in the movement of the movable guard hood element 24.

As can be also be seen from FIGS. 1 and 6 the operating and display unit 40 is mounted at the end 23 of the stationary guard hood element 22, being the end which faces towards the operative position of the movable guard hood element 24. As can be seen from FIG. 1, the operating and display unit 40 includes a monitor M and operating elements B arranged beneath the monitor M. As can further be seen from FIG. 1 and FIG. 6, the stationary guard hood element 22 extends over an angular range from the ramp 14, in such a way that, in the case of a person of average size, the operating and display unit 40 faces substantially in the horizontal direction of view of such a person. In order possibly to permit adaptation of the operating and display unit 40 to the direction of view of the operator, the operating and display unit 40 can be arranged at the upper end 23 of the stationary guard hood element 22 in such a way that it can be pivoted about a horizontal and/or a vertical axis (not shown).

What is claimed is:

1. Apparatus for balancing vehicle wheels, comprising
   a machine frame,
   a main shaft rotatably mounted in the machine frame and on which a vehicle wheel to be balanced can be clamped,
   a guard hood, which at least partially extends over the vehicle wheel to be balanced, said guard hood including a stationary guard hood element connected to the machine frame and a movable guard hood element which is movable between an operative closed position and inoperative open position, and an operating and display unit arranged at an upper end of the stationary guard hood element to face toward an operator, said moveable guard hood element moving beneath the operating and display unit during the transition between operative and inoperative positions.

2. Apparatus as set forth in claim 1 wherein the operating and display unit includes a monitor and operating elements.

3. Apparatus as set forth in claim 1 or claim 2 wherein the movable guard hood element is located forward of the stationary guard hood element.

4. Apparatus as set forth in claim 3, wherein the movable guard hood element is movably mounted to the stationary guard hood element by a guide structure.

5. Apparatus as set forth in claim 4, wherein the guide structure is formed by operatively connecting at least one guide rail mounted to the movable guard hood element and at least one guide roller mounted to the stationary guard hood element.

6. Apparatus as set forth in claim 5, wherein at least one guide roller is arranged at an end of the stationary guard good element which faces the operative position of the movable guard hood element.

7. Apparatus as set forth in claim 6, wherein the guide structure has two guide rails which are respectively mounted to edges of the movable guard hood element that extend along the direction of movement of the movable guard hood element, and the guide structure further includes eight guide rollers of which four are respectively arranged in two pairs, one on each of two edges of the stationary guard hood element that extend in the direction of movement of the movable guard hood element.

8. Apparatus as set forth in claim 7, wherein the guide rollers have a guide profile including a guide groove to engage the guide rail.

9. Apparatus as set forth in claim 8, wherein at least one guide roller is arranged on at least one guard strip of the stationary guard hood element, said guard strip surrounding the path of movement at the edges of the movable guard hood element.

10. Apparatus as set forth in claim 8, wherein the guide rollers having a guide groove are provided at an edge of the stationary guard hood element.

11. Apparatus as set forth in claim 10, wherein the movement of the movable guard hood element at the inoperative position and at the operative position is limited by an abutment to stop movement.

12. Apparatus as set forth in claim 11, wherein the movable hood guard element and stationery the hood guard element are each in the form of a segment of a circle with at least approximately equal radii of curvature.

13. Apparatus as set forth in claim 12, wherein the movable guard hood element has a smaller width, measured approximately transversely with respect to its direction of movement, than the width of the stationary guard hood element.

14. Apparatus as set forth in claim 1, further including a gripping member attached at a front end of the movable guard hood element.

15. Apparatus as set forth in claim 1, further including at least one weight-compensating mechanism operatively connected to the movable guard hood element.

16. Apparatus as set forth in claim 14, further including a telescopic bar having one end pivotally attached to the front end of the movable guard hood element and the other end pivotally attached to the stationary guard hood element.

17. Apparatus as set forth in claim 16, wherein the telescopic bar is pivoted to the stationary guard hood element in such a way that the telescopic bar extends substantially horizontally when the movable guard hood element is in the operative position.

18. Apparatus as set forth in claim 1, further including a ramp positioned at the bottom of the frame on which a vehicle wheel can be rolled.

19. Apparatus as in claim 9, wherein the guard strip is formed from sheet metal.

20. Apparatus as in claim 14, wherein the gripping member extends transversely.

* * * * *